(12) United States Patent
Li

(10) Patent No.: US 12,386,220 B2
(45) Date of Patent: Aug. 12, 2025

(54) DIMMABLE VISION CORRECTING EYEWEAR

(71) Applicant: Wicue, Inc., Cupertino, CA (US)

(72) Inventor: Fenghua Li, Cupertino, CA (US)

(73) Assignee: Wicue USA INC.

( * ) Notice: Subject to any disclaimer, the term of this patent is extended or adjusted under 35 U.S.C. 154(b) by 504 days.

(21) Appl. No.: 17/936,270

(22) Filed: Sep. 28, 2022

(65) Prior Publication Data
US 2023/0096546 A1 Mar. 30, 2023

Related U.S. Application Data

(60) Provisional application No. 63/249,496, filed on Sep. 28, 2021.

(51) Int. Cl.
*G02C 7/02* (2006.01)
*G02F 1/1335* (2006.01)

(52) U.S. Cl.
CPC ....... *G02F 1/133526* (2013.01); *G02C 7/022* (2013.01)

(58) Field of Classification Search
CPC ....... G02C 7/022; G02C 7/101; G02F 1/1313; G02F 1/13306; G02F 1/1334; G02F 1/133526
USPC ............................ 351/159.01, 159.49, 159.6
See application file for complete search history.

(56) References Cited

U.S. PATENT DOCUMENTS

| | | | | |
|---|---|---|---|---|
| 11,181,741 B1* | 11/2021 | Yaroshchuk | ........... | G02B 30/25 |
| 11,650,429 B2* | 5/2023 | Wang | ................... | G02B 27/286 |
| | | | | 349/201 |
| 2015/0002809 A1* | 1/2015 | Cohen-Tannoudji | ....................... | |
| | | | | G02B 1/005 |
| | | | | 351/159.63 |
| 2017/0315417 A1* | 11/2017 | Alton | ................... | G02F 1/13306 |
| 2020/0409208 A1* | 12/2020 | Li | ............................ | C03C 17/23 |
| 2021/0165484 A1* | 6/2021 | Suguhara | ................ | G06F 3/013 |
| 2021/0183342 A1* | 6/2021 | Kunitomo | ............. | G06F 3/1454 |
| 2021/0255465 A1* | 8/2021 | Lee | ..................... | G02F 1/13439 |
| 2022/0276499 A1* | 9/2022 | Wang | ................... | G02B 5/1814 |

* cited by examiner

*Primary Examiner* — William R Alexander
(74) *Attorney, Agent, or Firm* — PV IP PC; Wei Te Chung

(57) ABSTRACT

Described are eyewear with one or more dimmable vision correction lens stacks. The eyewear can have various form factors, including eyeglasses with a separate lens stack for each eye. The vision correction lens stack may have a first lens and a second lens, with a dimmable liquid crystal layer arranged between the first lens and the second lens. The first lens and second lens may have the same refractive index, the refractive index may be configured according to a prescription of the user. The dimmable liquid crystal layer may be electrically coupled to a control module which may be used to change the light transmittance of the liquid crystal layer.

20 Claims, 10 Drawing Sheets

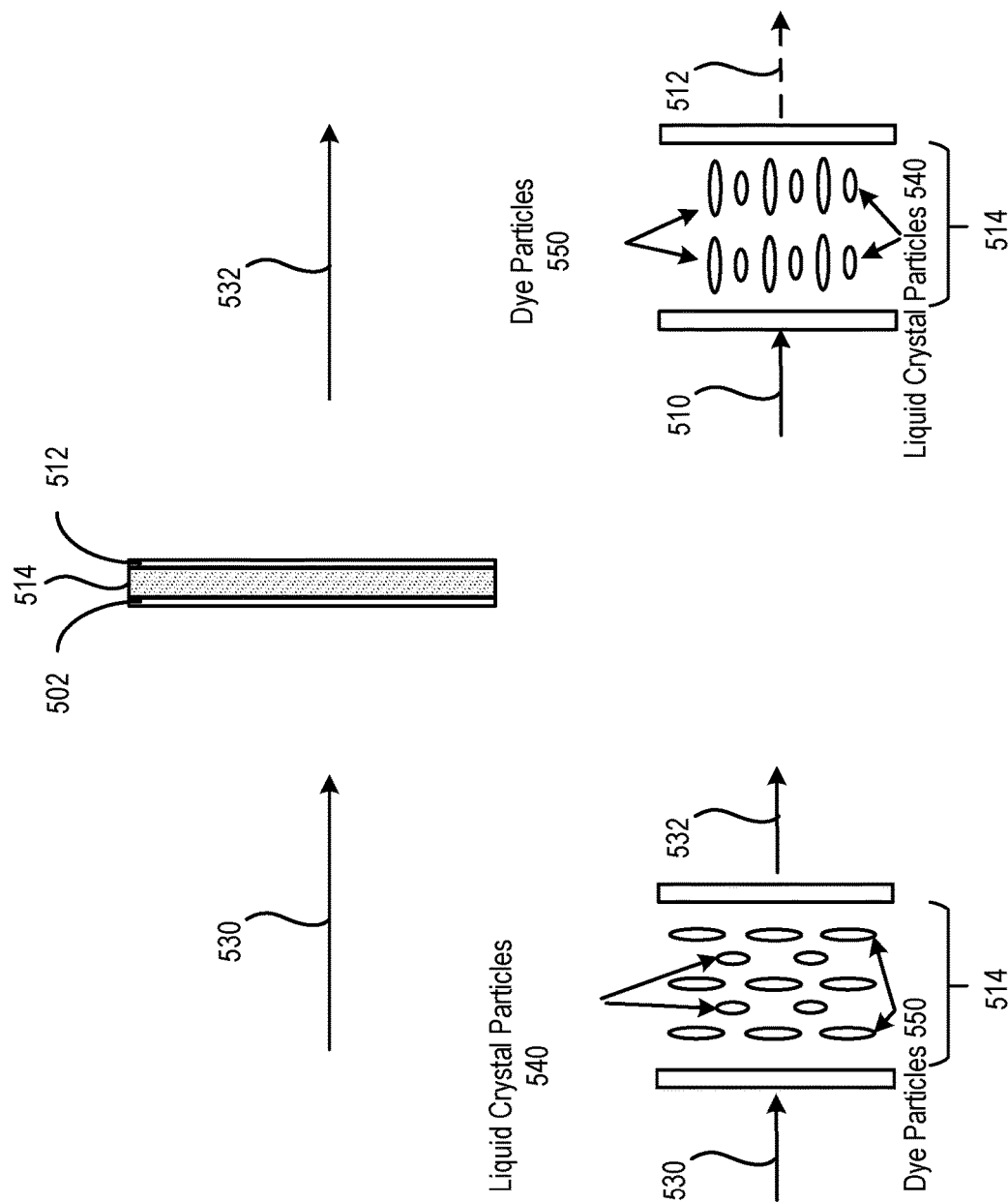

DIMMABLE VISION CORRECTING EYEWEAR

CROSS-REFERENCE TO RELATED APPLICATIONS

This application claims the benefit of U.S. Provisional Application No. 63/249,496, filed Sep. 28, 2021, entitled "DIMMABLE MYOPIA GLASSES" which is incorporated herein by reference in its entirety.

TECHNICAL FIELD

The present disclosure relates to the technical field of prescription glasses, in particular to prescription glasses that are dimmable.

BACKGROUND

At present, there are photochromatic dimming eyeglasses on the market which feature lenses that can adjust the light transmittance according to ultraviolet (UV) light exposure, so that the eyes of a user can be in a more comfortable environment and to avoid problems such as strong light stimulation and dark light. But those photochromatic dimming glasses are slow, taking up to three minutes to transition from dark to clear.

Other dimming glasses may include a frame on which a lens is arranged, and the surface of the lens is provided with a dimmable liquid crystal (LC) layer. However, because the dimmable liquid crystal layer is located on the surface of the lens, it often happens that the user's hand touches the dimmable liquid crystal layer, causing the dimmable liquid crystal layer to be contaminated or damaged. For example, when the user cleans dirt on the dimmable liquid crystal layer, it is easy to scratch the dimmable liquid crystal layer. This is especially problematic for users who require vision correcting glasses, e.g., to correct for myopia. Such users may touch the dimmable liquid crystal layer when picking up and placing the glasses, making the LC layer susceptible to damage and reducing the service life of the vision correcting glasses.

BRIEF SUMMARY

One problem to be solved according to the techniques of the present disclosure is to provide dimmable myopia glasses with long service life. In order to solve this and other technical problems, the technical solution adopted in some embodiments of the disclosure involves: a pair of vision correction dimming glasses, including a frame, a dimmable liquid crystal layer and a control module, the frame being provided with two sets of vision correction lenses. The control module is arranged on the frame and is electrically coupled to the dimmable liquid crystal layer. Each set of vision correction lenses includes two lenses: a first lens and a second lens. The dimmable liquid crystal layer is arranged between a first lens and a second lens and is connected to both the first lens and the second lens.

Further, one side of the first lens connected to the dimmable liquid crystal layer is a flat surface, and the other side of the first lens is a concave surface; the side of the second lens connected to the dimmable liquid crystal layer is a flat surface, and the other side of the second lens is a convex surface.

Further, the material of the first lens is glass or resin.

Further, the material of the second lens is glass or resin.

Further, the refractive index of the first lens is the same as the refractive index of the second lens.

Further, the dimmable liquid crystal layer includes a first substrate and a second substrate. A liquid crystal layer is arranged between the first substrate and the second substrate. The first substrate is connected to the first lens. The second substrate is connected to the second lens.

Further, the dimmable liquid crystal layer is a cholesteric liquid crystal film.

Further, the control module includes a control board, a battery, and a control key (e.g., a push button) or other user input device, and the control board is electrically connected to the control key, the dimmable liquid crystal layer, and the battery.

Further, the control module includes a control board, a battery, and a light sensor, and the control board is electrically connected to the light sensor, the dimmable liquid crystal layer, and the battery, respectively.

Further, the dimmable liquid crystal layer includes two layers of liquid crystal film.

The above-described combination of features is merely exemplary. Other embodiments may include additional components, omit certain components, or have a different arrangement of components with respect to each other. One beneficial effect of the above-described combination of features is that the first lens and the second lens can together form a myopic lens (suitable for correcting myopia), and the dimmable liquid crystal layer position can be hidden between the first lens and the second lens. Further, the first lens and the second lens can provide good protection for the dimmable liquid crystal layer, which can effectively prevent the dimmable liquid crystal layer from being polluted and scratched, which is in turn beneficial to prolonging the service life of the vision correction dimming glasses. Especially for prescription patients, an excellent user experience can be obtained when using the prescription dimming glasses.

BRIEF DESCRIPTION OF THE DRAWINGS

FIG. 5 shows an example of a guest-host liquid crystal with dye usable for implementing one or more embodiments.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

In order to explain in detail the technical content, the achieved purpose and the effect of the present disclosure, the following description will be given in conjunction with the embodiments and the accompanying drawings.

Aspects of the present disclosure relate to a liquid crystal (LC) assembly that includes one or more liquid crystal cells, e.g., an LC cell comprising a liquid crystal layer confined between solid layers or substrates. In some embodiments, an LC assembly is electrically controllable to vary the light transmittance of the LC assembly, i.e., dimmable. In embodiments featuring an LC assembly with multiple cells, each cell may correspond to a different segment along a surface of the LC assembly, and the cell may be individually controlled to vary the transmittance of that segment without affecting the transmittance of other segments.

As used herein, the term "dimmable" refers to the ability to vary light transmittance up or down by means of one or more control signals. For instance, an LC cell may include a pair of electrodes on opposite sides of the liquid crystal layer, where a voltage applied across the electrodes causes the liquid crystal particles (e.g., individual liquid crystal molecules) to align in such a way that the LC cell is darkened by reducing the amount of light that is able to pass through the LC cell. There are various types of dimmable LC cells, including twisted nematic (TN), Guest-Host (GH), vertical alignment (VA), and others. Dimmable LC cells can be configured so that the light transmittance is highest when the value of the control signal is at its lowest (e.g., zero volts). Such cells are sometimes referred to as being "normally-white" (NW). Alternatively, dimmable LC cells can be configured so that the light transmittance is lowest when the value of the control signal is at its lowest.

Although described in connection with binocular eyewear, e.g., a pair of eyeglasses, the inventive features disclosed herein may also be used in conjunction with monocular eyewear or, in some instances, incorporated into one lens of an eyeglass but not the other lens.

Figure 1A:
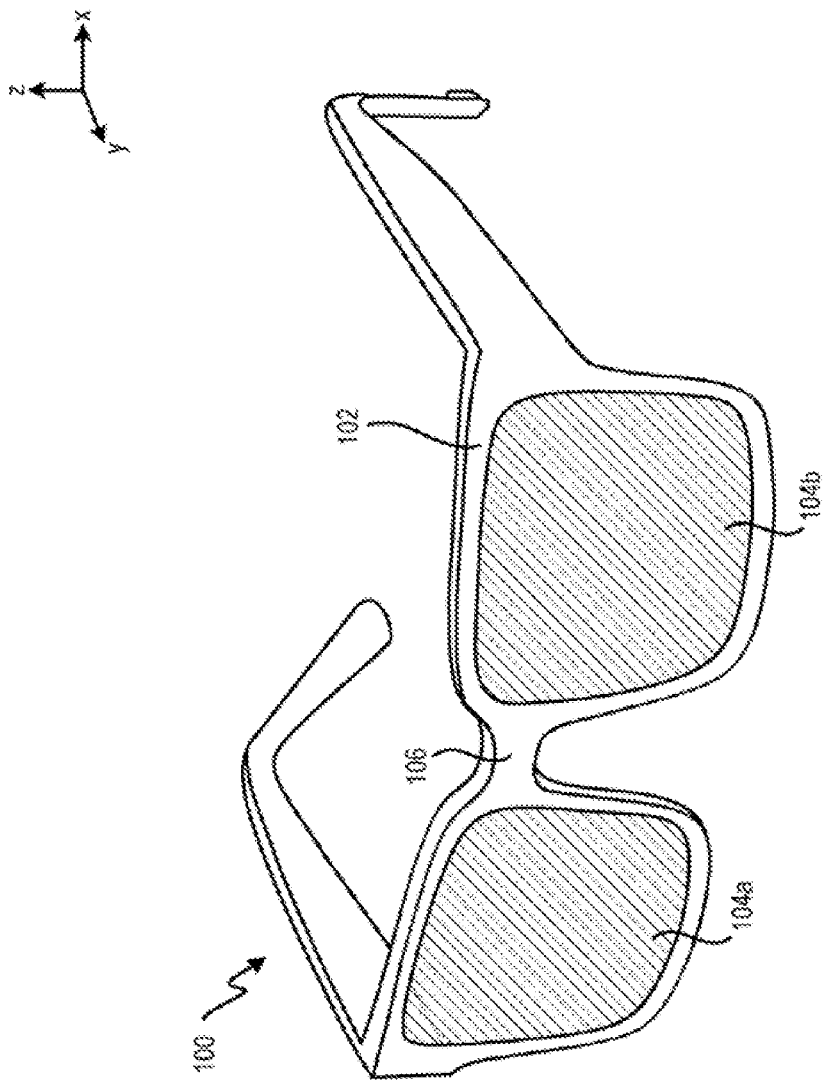
FIGS. 1A-1C shows examples of dimmable prescription lenses incorporated into eyewear, according to some embodiments.
Figure 1B:
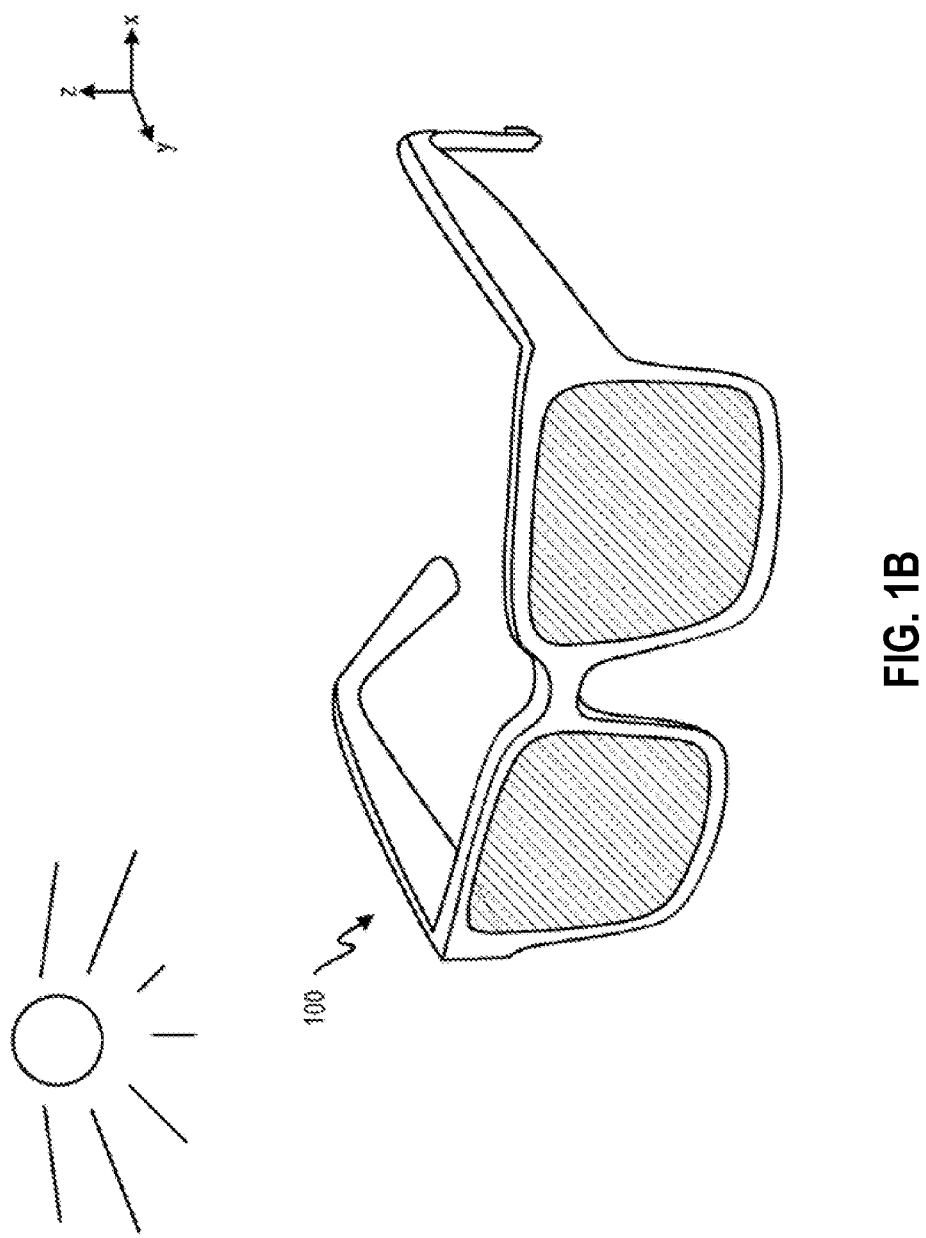
Figure 1C:
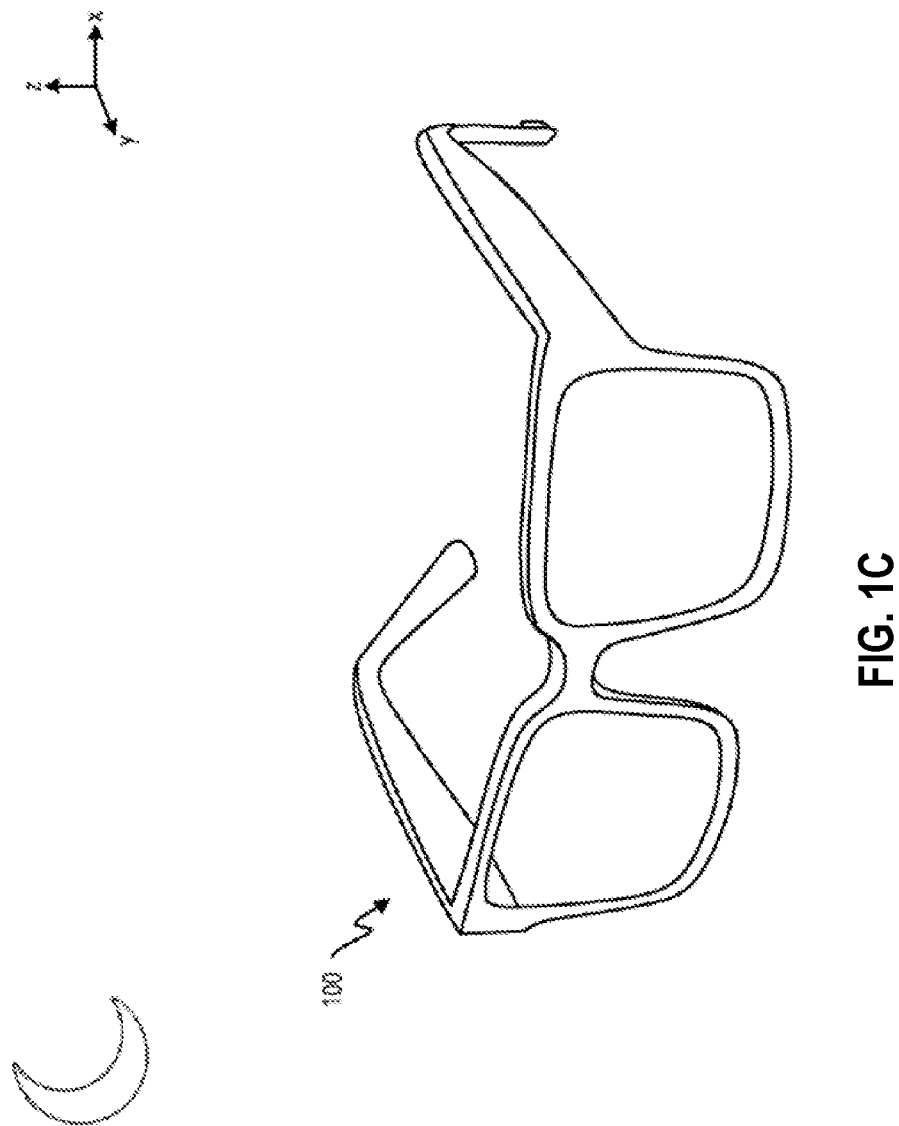

FIGS. 1A, 1, and 1C, illustrate an example of a dimmable eyewear 100 and its operations, according to some embodiments. As shown in FIG. 1A, eyewear 100 includes an optional frame 102 and one or more vision correction lens stacks 104. In the example of FIG. 1A, eyewear 100 may include two vision correction lens stacks 104a and 104b. In some examples, eyewear 100 may be frameless, and may include a single vision correction lens stack 104 or two vision correction lens stacks 104a and 104b connected by a connection structure 106. In both examples, one or more vision correction lens stacks 104 can have configurable light transmittance which can be configured/adjusted based on an ambient light intensity. Specifically, as shown in FIG. 1B, in an environment with high ambient light intensity (e.g., outdoor under the sun), the light transmittance of one or more vision correction lens stacks 104 can be reduced to reduce the intensity of light that passes through one or more vision correction lens stacks 104 into a user's eye(s), thereby protecting the eye(s) from exposure to high energy light. Moreover, as shown in FIG. 1C, in an environment with low ambient light intensity (e.g., outdoor at night, indoor, etc.) the light transmittance of one or more vision correction lens stacks 104 can be increased, so that the user can maintain a reasonable vision when wearing eyewear 100 in the low light environment.

FIGS. 2A-2D show side views of example dimmable vision correction lens stacks, according to some embodiments. In each of the examples shown in FIGS. 2A-2D, the lens stack includes a liquid crystal layer between a pair of lenses: a first lens and a second lens. The lenses have various shapes and are, in general, three-dimensionally curved to form an optical system with an optical power suitable for correcting the vision of a user. For instance, each of the lenses may include a surface having a three-dimensional (3D) curvature, e.g., concave or convex on one side of the lens. The 3D surface of the lens can be characterized by a curvature along a first direction and a curvature along a second direction, with the curvature along the first direction typically being different from the curvature along the second direction. For instance, the 3D surface may be curved in a first plane (e.g., the y-z plane in FIG. 1A) and curved in a second plane orthogonal to the first plane (e.g., the x-y plane). As such, the 3D surface may correspond in shape to a surface of a spherical lens or aspheric lens, with the curvature depending on the vision correction needs of the user. Together with the first lens, the second lens may, for example, provide an optical power associated with myopia (e.g., a negative diopter value). The curvatures of the first lens and the second lens may also be configured to correct for other eye conditions besides nearsightedness including, for example, astigmatism.

Additionally, each lens may include a flat surface opposite the curved surface. The flat surface facilitates attachment of the lens to the liquid crystal layer, which can be manufactured separately from the lenses, as an assembly comprising an LC stack. The LC stack can include a pair of substrates that provide mechanical support for and/or confinement of the liquid crystal in the liquid crystal layer. In general, such substrates are substantially flat. For example, the flat surface of the first lens may be configured to mate (e.g., attach flush) with a flat surface of a first substrate in the LC stack. Similarly, the flat surface of the second lens may be configured to mate with a flat surface of a second substrate in the LC stack. In this manner, the first lens, the second lens, and the LC stack can form a cohesive unit with opposing surfaces of these components conforming to each other, and with little or no gaps in between. Preferably, the LC stack is substantially uniform in thickness so as to have minimal or no influence on the optical characteristics of the optical system formed by the first lens and the second lens. However, it may be possible to account for any non-uniform shape of the LC stack by modifying the curvatures of the first lens and/or the second lens, as appropriate. Accordingly, in some embodiments, the LC stack may also be an optical element of the optical system.

Figure 2A:
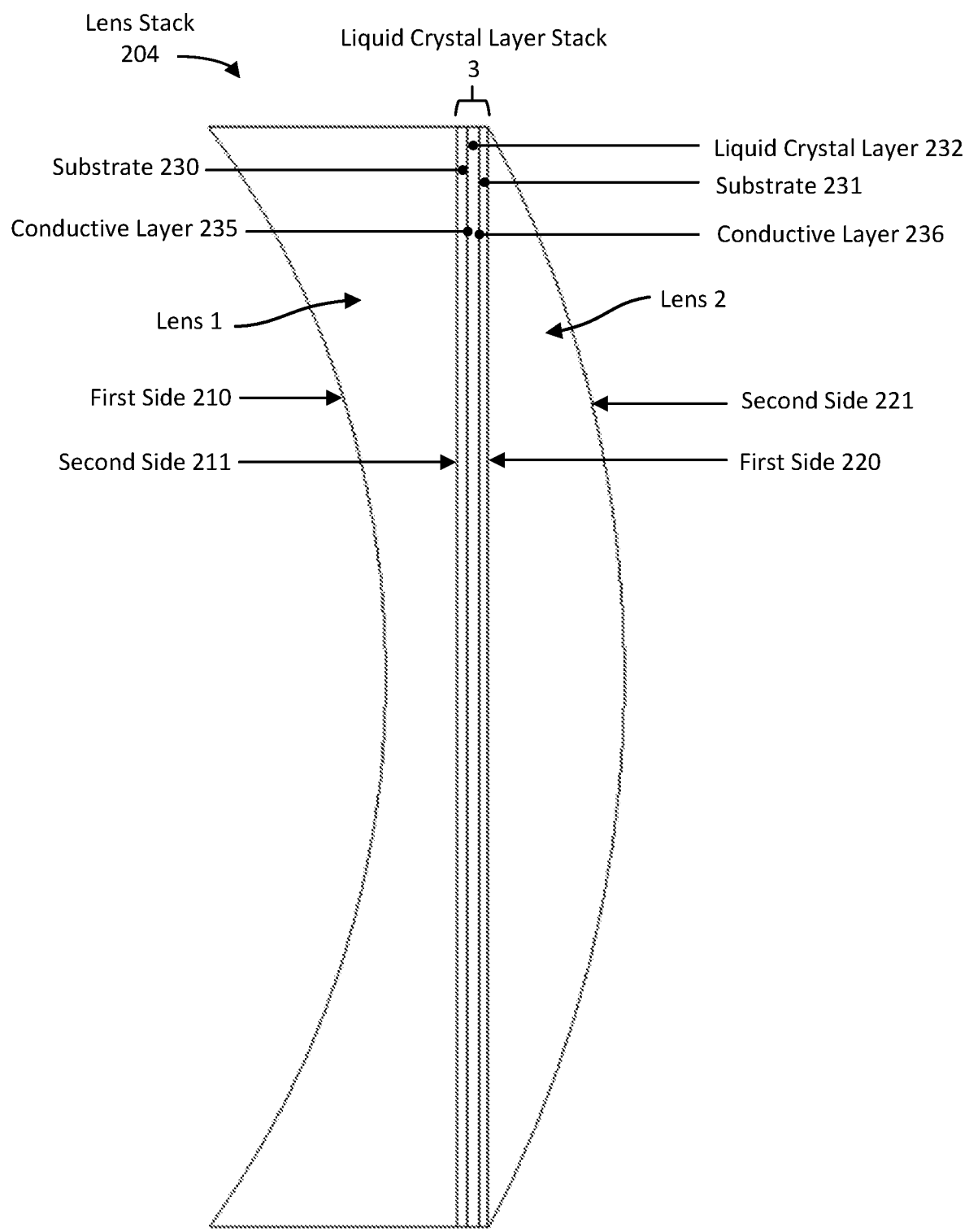
FIGS. 2A-2D show side views of example dimmable vision correction lens stacks, according to some embodiments.
Figure 2B:
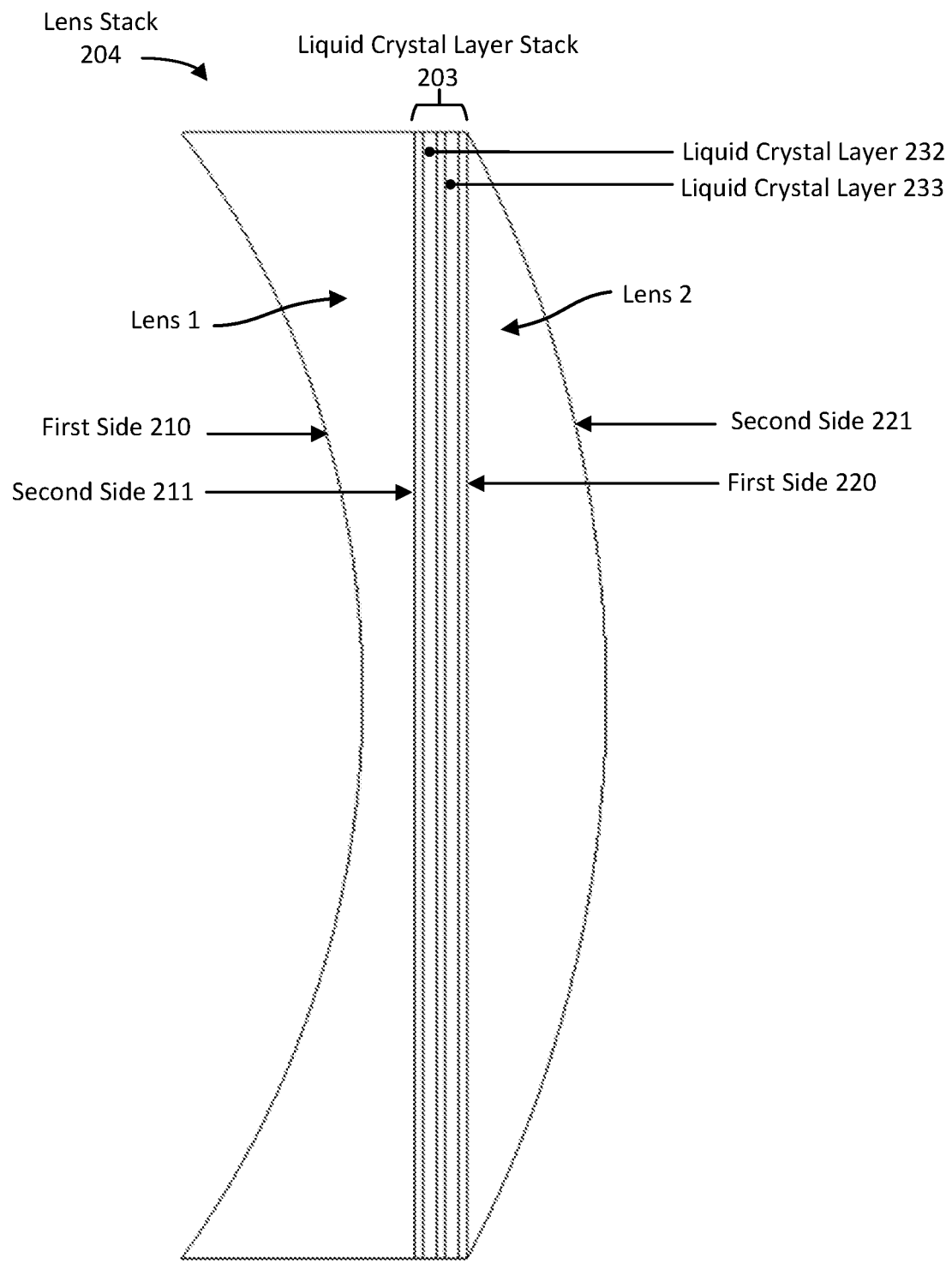

FIGS. 2A and 2B, which are described in further detail below, show example lens stacks 204, according to some embodiments. Each lens stack 204 may correspond to an implementation of the lens stack 104 described above. The frame (not shown) is provided with two sets of vision correction lens stacks and the control module is provided on the frame and is electrically coupled to the dimmable liquid crystal layer stack 3. The control module may be integrated into the frame. Alternatively, the control module may be mechanically coupled to the frame, in some instances, detachably connected. Each group of the lens stacks includes a first lens 1 and a second lens 2. The dimmable liquid crystal layer stack 3 is arranged between the first lens 1 and the second lens 2 and is mechanically coupled, e.g., directly connected, to both the first lens 1 and the second lens 2.

Beneficial effects of the lens stacks 204 shown in FIGS. 2A and 2B include, among things, that the first lens 1 and the second lens 2 are combined into a myopic lens while the dimmable liquid crystal layer stack 3 is hidden between the first lens 1 and the second lens 2. The first lens 1 and the second lens 2 can protect the dimmable liquid crystal layer stack 3 effectively, preventing the dimmable liquid crystal layer stack 3 from being contaminated and scratched, which is beneficial to prolonging the service life of the dimming glasses. Similar protection is provided by the example lens stacks 204 shown in FIGS. 2C and 2D, discussed below.

Further, one side of the first lens 1 connected to the dimmable liquid crystal layer stack 3 is a flat surface, and the other (opposite) side of the first lens 1 is a concave surface. One side of the second lens 2 connected with the dimmable liquid crystal layer stack 3 is a flat surface, and the other side of the second lens 2 is a convex surface. In some embodiments, the other side of the second lens 2 is a concave surface.

In some embodiments, a first side of the first lens connected to the dimmable liquid crystal layer is a flat surface and the other side of the first lens is a convex surface. One side of the second lens connected to the dimmable liquid crystal layer is a flat surface and the other side of the second lens is a convex surface. In still some other embodiments, the other side of the second lens is a concave surface.

As can be seen from the above description, the first and second lenses are connected to the dimmable liquid crystal layer stack 3 on a flat surface, so that the dimmable liquid crystal layer stack 3 and the first and second lenses can form a more stable connection. In addition, the difficulty of designing and manufacturing the dimmable liquid crystal layer stack 3 can be reduced, and the working stability of the dimmable liquid crystal layer stack 3 can be ensured.

Further, the material of the first lens 1 is glass or resin.

Further, the material of the second lens 2 is glass or resin. Thus, the materials of the first and second lenses can be selected as required.

Further, the refractive index of the first lens 1 and the refractive index of the second lens 2 are the same. Making the refractive index of the first lens 1 and the refractive index of the second lens 2 the same facilitates the design of the prescription power of the prescription dimming glasses. As such, the refractive indices of the first lens and the second lens may be configured according to a user's eye prescription.

Further, the dimmable liquid crystal layer stack 3 includes a first substrate and a second substrate, a liquid crystal layer is arranged between the first substrate and the second substrate, with the first substrate being connected to the first lens 1, and the second substrate being connected to the second lens 2. Thus, the dimmable liquid crystal layer stack 3 has a simple structure and good working stability.

Further, the dimmable liquid crystal layer stack 3 is a cholesteric liquid crystal film. Cholesteric liquid crystal film is readily available from a wide range of sources.

Further, the control assembly includes a control board, a battery, and a control key or other user input device, and the control board is electrically connected to the control key, the dimmable liquid crystal layer stack 3, and the battery. The user is able to control the degree of light transmission of the dimmable liquid crystal layer stack 3 through the control key/input device.

Further, the control assembly includes a control board, a battery, and a light sensor, and the control board is electrically connected to the light sensor, the dimmable liquid crystal layer stack 3, and the battery. The dimmable myopia glasses can automatically control the light transmittance of the dimmable liquid crystal layer stack 3 based on a signal from the light sensor.

Further, the dimmable liquid crystal layer stack 3 includes two layers of liquid crystal film. It can be seen from the above description that the specific structure of the dimmable liquid crystal layer stack 3 can be set as needed, and the dimmable liquid crystal layer stack 3 can be composed of multilayer liquid crystal films (e.g., three or more LC films) to provide a greater range and/or finer granularity of light transmission options (for example, 20% light transmission, 40% light transmission, etc.).

FIG. 2A shows a first embodiment of a dimmable vision correction lens stack 204 with a first lens 1, a second lens 2, and a liquid crystal layer stack 3. The lens stack 204 is an optical assembly that can be used in place of a lens in a conventional pair of glasses. In particular, the lens stack 204 can be configured to correct for myopia in an eye of a user, as a component of dimmable myopia glasses.

The dimmable myopia glasses may include a frame (not shown in the figure), a dimmable vision correction lens stack 204 and a control module (not shown in the figure). Two sets of vision correction lens stacks 204 may be arranged on the frame. The control module is arranged on the frame and is electrically coupled to the dimmable liquid crystal layer stack 3, and each set of lens stacks 204 includes a first lens 1, a second lens, and a liquid crystal layer stack 3. Within each set of lens stacks 204, the dimmable liquid crystal layer stack 3 is arranged between the first lens 1 and the second lens 2 and is connected to the first lens 1 and the second lens 2. The frame of the dimmable myopia glasses may include a spectacle frame and a temple that are connected, the spectacle frame being provided with two mounting elements or sub-frames, with a set of lens stacks 204 respectively mounted in each mounting element/sub-frame (e.g., via friction fit).

To facilitate production, the first lens 1 has a first side 210 and a second side 211. In the embodiment shown, the second side 211 is connected to the dimmable liquid crystal layer stack 3 and is a flat surface. The first side 210 of the first lens 1 is a concave surface. The second lens 2 has a first side 220 and a second side 221. The first side 220 of the second lens 2 is connected to the dimmable liquid crystal layer stack 3 and is a flat surface, and the second side 221 of the second lens 2 is a convex surface. The dimmable liquid crystal layer stack 3 may be bonded (e.g., laminated or glued) to the first lens 1 and the second lens 2.

The material of the first lens 1 can be glass or resin. Likewise, the material of the second lens 2 can also be glass or resin. In order to facilitate the design of vision correction, the refractive index of the first lens 1 and the refractive index of the second lens 2 are preferably the same. The refractive index may be changed to meet the vision correction desired by a user, e.g., the prescription of the user.

The dimmable liquid crystal layer stack 3 includes a first substrate 230 and a second substrate 231. A liquid crystal layer 232 is provided between the first substrate 230 and the second substrate 231, and a first conductive layer 235 is provided on the side of the first substrate 230 close to (facing) the liquid crystal layer 232. A second conductive layer 236 is provided on a side of the second substrate 231 close to the liquid crystal layer 232. The first substrate 230 is connected to the first lens 1, and the second substrate 231 is connected to the second lens 2. In some embodiments, including the embodiment of FIG. 2A, the liquid crystal layer 232 of the dimmable liquid crystal layer stack 3 is a cholesteric liquid crystal film. The conductive layers 235 and 236 each comprise an electrically conductive material, e.g., a coating of indium tin oxide (ITO), that permits the conductive layers to act as electrodes.

The setting position of the control module can select the spectacle frame and/or the temples. When the adjustment of the dimmable liquid crystal layer stack 3 is carried out manually, the control module may include a control board, a battery, and a control key (e.g., a push button or rotating dial) or some other user input device. The control board is electrically coupled to the control key, the dimmable liquid crystal layer stack 3, and the battery. When the adjustment of the dimmable liquid crystal layer stack 3 is performed in an automatic manner, the control module may include a control board, a battery, and a light sensor, and the control board is electrically coupled to the light sensor, the dimmable liquid crystal layer stack 3, and the battery.

FIG. 2B shows a second embodiment of the dimmable vision correction lens stack 204. The dimmable vision correction lens stack may be placed in a frame (not shown) and is connected to a control module (not shown) which may be used to control the dimmability, e.g., the light transmittance, of the vision correction lens stack. In the embodiment shown, the dimmable vision correction lens stack 204 has a first lens 1, a second lens 2, and a dimmable liquid crystal layer stack 203. The dimmable liquid crystal layer stack 203 is arranged between the first lens 1 and the second lens 2 and is connected to both the first lens 1 and the second lens 2.

The first lens 1 and the second lens 2 are configured in a similar manner as the first lens 1 and the second lens 2 in FIG. 2A, respectively. In FIG. 2B, the first lens 1 has a first side 210 and a second side 211. As shown in FIG. 2B, the second side 211 is connected to the dimmable liquid crystal layer stack 203 and is a flat surface. The first side 210 of the first lens 1 is a concave surface. The second lens 2 has a first side 220 and a second side 221. The first side 220 of the second lens 2 is connected to the dimmable liquid crystal layer stack 203 and is a flat surface, and the second side 221 of the second lens 2 is a convex surface. The dimmable liquid crystal layer stack 203 may be bonded to the first lens 1 and the second lens 2. As with the embodiment of FIG. 2A, the material of the first lens 1 can be glass or resin. Likewise, the material of the second lens 2 can be glass or resin.

In the example of FIG. 2B, the dimmable liquid crystal layer stack 203 includes two layers of liquid crystal: a first liquid crystal layer 232 and a second liquid crystal layer 233. Each liquid crystal layer can be configured in a similar manner as described above with respect to the liquid crystal layer 232 in FIG. 2A. For example, each of the liquid crystal layers 232 and 233 may optionally be a cholesteric liquid crystal film. When the liquid crystal layer stack has more than one liquid crystal layer, the dimmable myopia glasses have more light transmittance options. The setting position of the control module can select the spectacle frame and/or the temples when the adjustment of the dimmable liquid crystal layer stack 203 is carried out manually. The control module includes a control board, a battery, and a control key/input device. The control board is electrically connected to the control key, the dimmable liquid crystal layer stack 203, and the battery. When the adjustment of the dimmable liquid crystal layer stack 203 is performed in an automatic manner, the control component can include a control module, a battery, and a light sensor. The control module is electrically connected to the light sensor, the dimmable liquid crystal layer stack 203, and the battery.

The LC layer stack 203 shown in FIG. 2B is one example of an alternative design for a liquid crystal layer stack. The examples in FIGS. 2C and 2D feature an LC layer stack 3 corresponding to the LC layer stack 3 described above in reference to FIG. 2A. However, other LC layer stack designs are also possible.

Figure 2C:
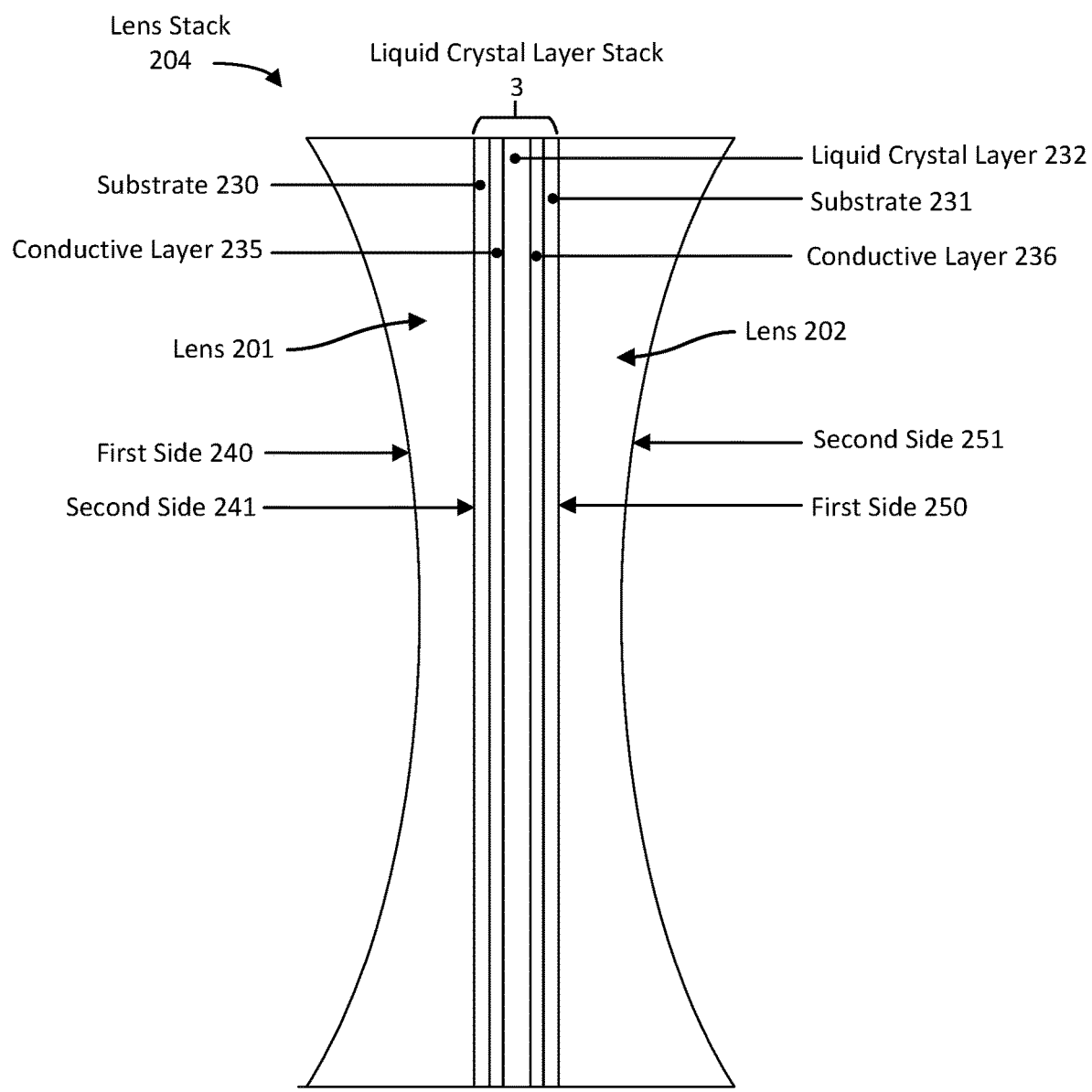

FIG. 2C shows another example of a lens stack 204. The lens stack 204 of FIG. 2C includes a first lens 201, a second lens 202, and an LC layer stack 3 arranged between the first lens 201 and the second lens 202. In the embodiment shown, the LC layer stack 3 is configured in a similar manner to the LC layer stack 3 in FIG. 2A. For instance, the LC layer stack 3 of FIG. 2C has a single liquid crystal layer 232. Further, the LC layer stack 3 has a first substrate 230 and a second substrate 231, each arranged on opposite sides of the liquid crystal layer 232. Between the first substrate 230 and the liquid crystal layer 232 is a first conductive layer 235. Between the second substrate 231 and the liquid crystal layer 232 is a second conductive layer 236. Unlike in FIG. 2A, FIG. 2C shows the conductive layers 235 and 236 in more detail for added clarity, as layers having a certain thickness. In some embodiments, the lens stack 204 of FIG. 2C may include more than one liquid crystal layer, e.g., two LC layers, similar to the LC layer stack 203 in FIG. 2B.

The first lens 201 has first side 240 and a second side 241. The second lens 202 has a first side 250 and a second side 251. In the example of FIG. 2C, the second side 241 of the first lens 201 is connected to the dimmable liquid crystal layer stack 3 and is a flat surface. The first side 240 of the first lens 201 is a concave surface. The first side 250 of the second lens 202 is connected to the dimmable liquid crystal layer stack 3 and is a flat surface, and the second side 251 of the second lens 202 is a concave surface. The dimmable liquid crystal layer stack 3 may be bonded to the first lens 201 and the second lens 202.

Figure 2D:
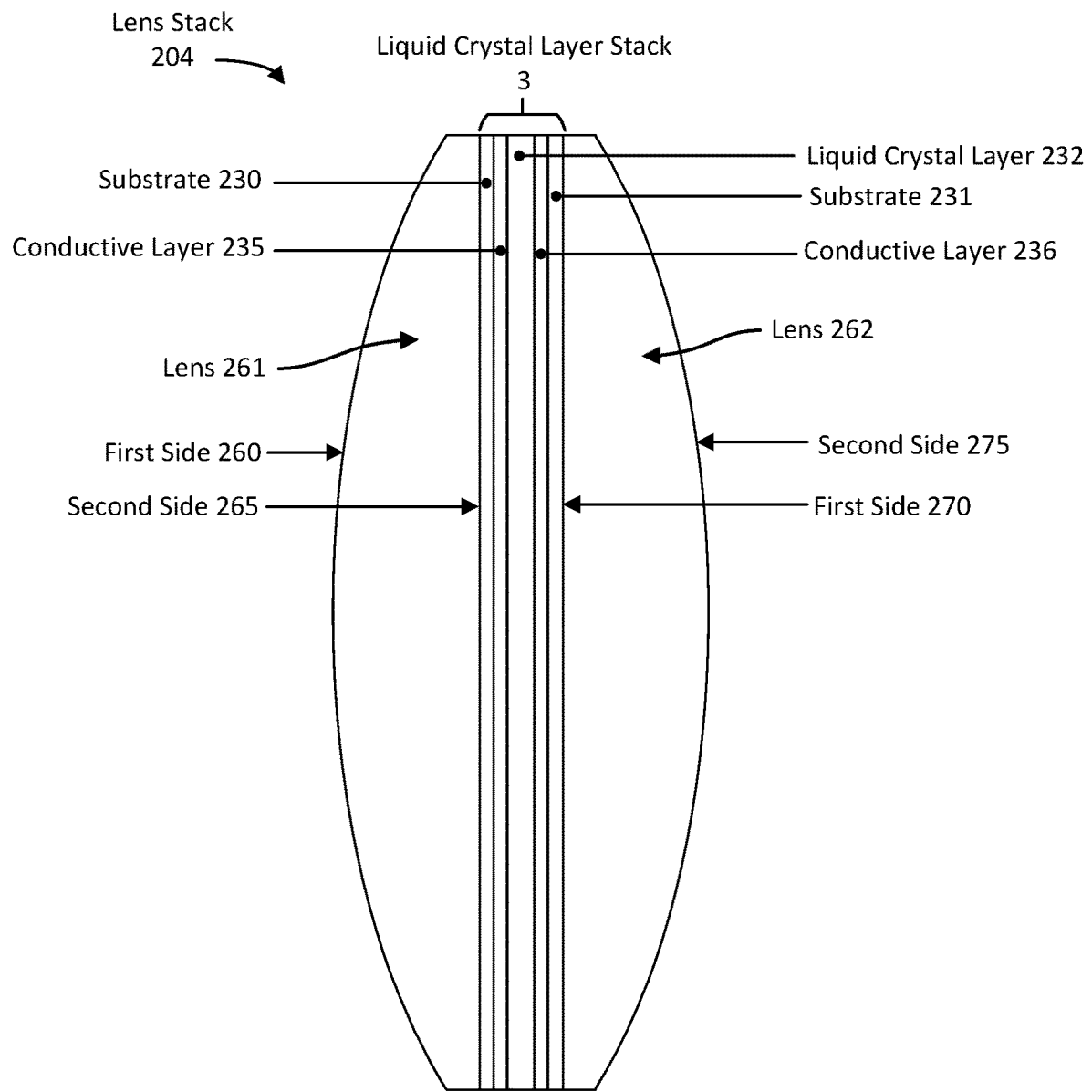

FIG. 2D shows yet another example of a lens stack 204. In FIG. 2D, the lens stack 204 includes a first lens 261, a second lens 262, and a LC layer stack 3 arranged between the first lens 261 and the second lens 262. In the embodiment shown, the LC layer stack 3 is configured in a similar manner to the LC layer stack 3 in FIGS. 2A and 2C. For instance, the LC layer stack 3 of FIG. 2D has a single liquid crystal layer 232. Further, the LC layer stack 3 has a first substrate 230 and a second substrate 231, each arranged on opposite sides of the liquid crystal layer 232. Between the first substrate 230 and the liquid crystal layer 232 is a first conductive layer 235. Between the second substrate 231 and the liquid crystal layer 232 is a second conductive layer 236. In some embodiments, the lens stack 204 of FIG. 2D may include more than one liquid crystal layer, e.g., two LC layers, similar to the LC layer stack 203 in FIG. 2B.

The first lens 261 has first side 260 and a second side 265. The second lens 262 has a first side 270 and a second side 275. The second side 265 of the first lens 261 is connected to the dimmable liquid crystal layer stack 3 and is a flat surface. The first side 260 of the first lens 261 is a convex surface. The first side 270 of the second lens 262 is connected to the dimmable liquid crystal layer stack 3 and is a flat surface, and the second side 275 of the second lens 262 is a convex surface. The dimmable liquid crystal layer stack 3 may be bonded to the first lens 261 and the second lens 262.

Figure 3:
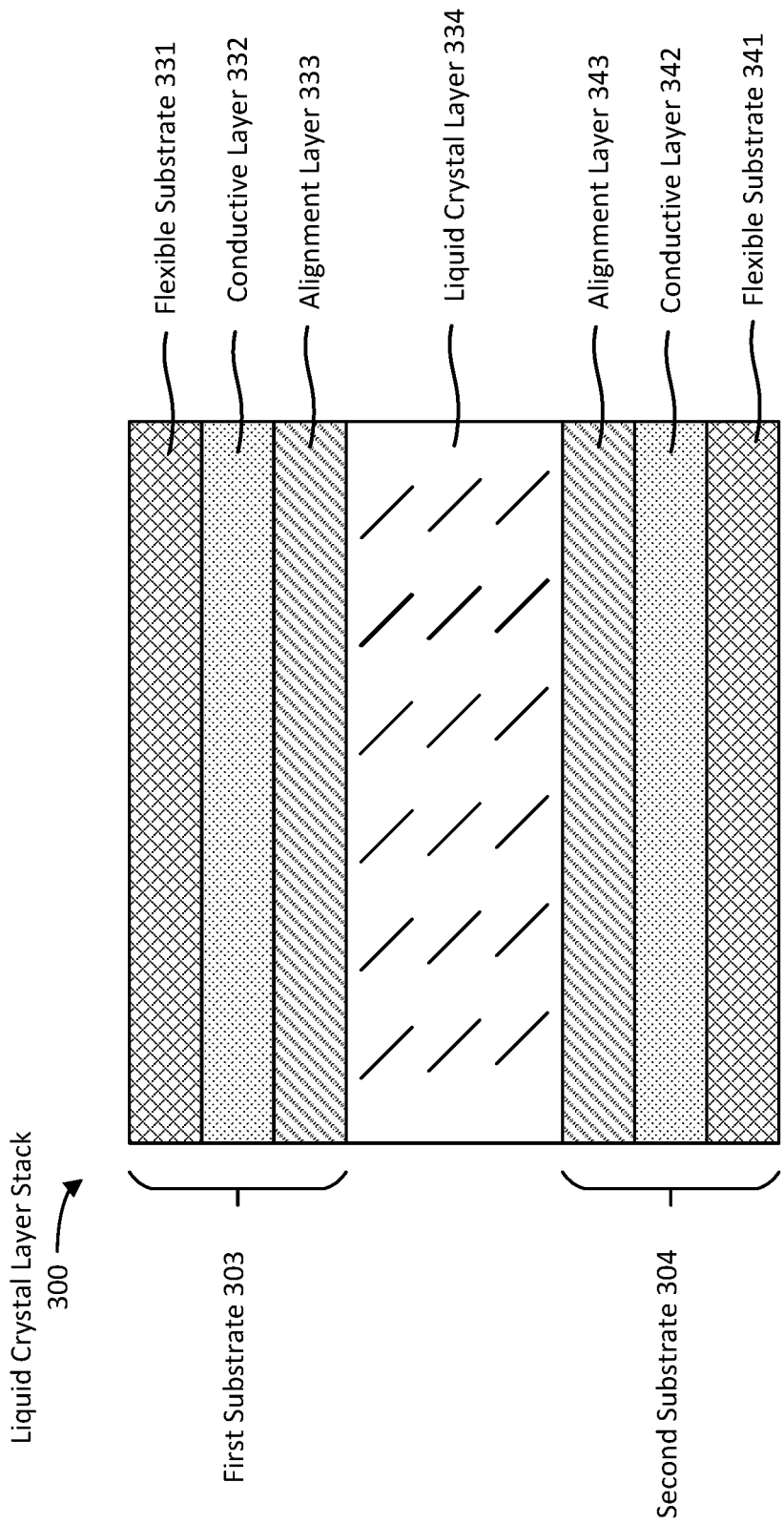
FIG. 3 shows an example cross section of a liquid crystal layer, according to some embodiments.

FIG. 3 shows a cross section of a dimmable liquid crystal layer stack 300 according to some embodiments. For instance, LC layer stack 300 may correspond to an LC layer stack in any of the examples shown in FIGS. 2A-2D. The LC layer stack 300 has a first substrate 303 and a second substrate 304. Between the two substrates is a liquid crystal layer 334. In some embodiments, the liquid crystal layer 334 may comprise a Guest-Host liquid crystal. In other embodiments, the liquid crystal layer 334 may comprise a twisted nematic liquid crystal.

In the example of FIG. 3, each of the substrates 303 and 304 is not a single layer but is instead a stack of layers incorporating aspects of the substrates and conductive layers described above with respect to FIGS. 2A-2D. As shown, the first substrate 303 has a first flexible substrate 331, a first conductive layer 332, and an alignment layer 333. However, in some embodiments, the substrates 303 and 304 can be implemented as a single layer or some other subset of the layers shown in FIG. 3. For example, the first substrate 303 may only be one of the first flexible substrate 331, the first conductive layer 332, or the alignment layer 333. In some embodiments, the first substrate 303 may be two of the first flexible substrate 331, the first conductive layer 332, or the alignment layer 333. For example, the first substrate 303 may be an alignment layer in combination with a conductive layer. As a specific example, alignment layer 333 may include a rubbing pattern to align molecules of the liquid crystal layer 334 to a particular orientation. However, in embodiments that omit an alignment layer, a rubbing pattern may be placed onto the surface of an electrode, e.g., the first conductive layer 332 and/or the second conductive layer 342.

The second substrate 304 has a second flexible substrate 341, a second conductive layer 342, and a second alignment layer 343. The conductive layer 342 is analogous to the conductive layer 332. The alignment layer 343 is analogous to the alignment layer 333. For example, alignment layer 343 may include a rubbing pattern. In some embodiments, the second substrate 304 may only be one of the second flexible substrate 341, the second conductive layer 342, or the second alignment layer 343. In some embodiments, the second substrate 304 may be two of the second flexible substrate 341, the second conductive layer 342, or the second alignment layer 343.

The first conductive layer 312 and the second conductive layer 342 may each be electrically connected to a control module (not shown). The control module may be referred to as a driver circuit. The driver circuit may be used to supply voltage to change the state of liquid crystals in the liquid crystal layer 334.

The driver circuit can output an alternating current (AC) voltage across the liquid crystal layer 334 to generate an electric field. The AC voltage can potentially improve reliability and avoid damage to the liquid crystal, since impurities in the liquid crystal can sometimes keep a current associated with a direct current (DC) voltage flowing, which can decompose the liquid crystal molecules. The magnitude of the AC voltage can be configured based on the threshold voltage of liquid crystal layer 334, as well as the ambient light intensity, such that the orientation and/or twisted angle of the liquid crystal molecules vary according to the ambient light intensity. With such arrangements, the light transmittance of one or more lens assemblies can be configured based on the ambient light intensity.

The driver circuit can receive ambient light intensity information from various sources. In some examples, the dimmable eyewear may include optical sensors to sense the ambient light intensity. An optical sensor can be positioned at, for example, a nose bridge of a frame and/or some other location on the frame. An optical sensor can include any device that can convert light into an electrical signal, such as photodiodes.

In some embodiments, an optical sensor comprises one or more photovoltaic cells, such as solar cells, which can provide a DC current or a DC voltage to the driver circuit that reflects the ambient light intensity. The solar cells can also provide electric power to the driver circuit such that no battery is needed, which can reduce the weight and size of the eyewear. The driver circuit can include a power converter to convert the DC current/voltage to the AC voltage discussed above, in order to generate the electric field across the liquid crystal layer. In some examples, the solar cells can include miniature silicon-based solar cells having a rectangular shape and can have a range of dimensions between 6 millimeters (mm)×8 mm to 10 mm×10 mm.

The eyewear can include a housing to enclose the solar cells. The housing can be positioned on the frame and/or behind the lens stacks. The housing can also enclose the driver circuit that is electrically connected to electrodes of the lens stacks. The driver circuit can receive the DC current/voltage from solar cells, generate a corresponding AC voltage, and transmit the AC voltage to the electrodes to generate a variable electric field across the liquid crystal layer in the lens stacks.

In some embodiments, the frame can include a pin hole or other suitably-sized opening (not shown) to expose the solar cells enclosed within the housing to ambient light. For example, the pin hole can be located on the connection structure 106 (e.g., a nose bridge) of the eyewear 100 in FIG. 1A. The pin hole can be configured to facilitate light entering the housing from a front side of the user (e.g., toward the lenses and along the y direction in FIG. 1A) and to block light from other directions (e.g., from a side direction, from above or below the user, etc.) from entering housing. In some examples, the pin hole can have dimensions of 3 mm×3 mm.

Additionally, the pin hole can increase the sensitivity of the solar cells to light directly emitted from a light source (e.g., the sun, lamps, etc.) which can accurately represent the ambient light intensity, while decreasing the sensitivity of the solar cells to other types of light, e.g., reflections. Such arrangements can improve the correlation between the output of the solar cells (and thus the driver circuit's output) and the ambient light intensity. Moreover, the pin hole can also prevent exposing the entirety of the solar cells while allowing the solar cells to collect light, which can improve the visual appearance of the eyewear while preserving the eyewear's capabilities of sensing ambient light intensity and making a corresponding adjustment to the light transmittance.

In some embodiments, the eyewear further includes a light guide between the pin hole and the solar cells. The light guide can receive a narrow beam of light via the pin hole and can project a sheet of light onto the solar cells, to spread the light energy more uniformly over the solar cells. The light guide may include acrylic material and can have a surface configured to diffuse light. A typical voltage range of the solar cell, based on the sheet of light received via a light guide, can be between 0 to 2.1V.

In some embodiments, a coating can be placed on a frame, on a housing, and/or on a lens assembly (e.g., a lens stack 104). The coating can be a darkened coating and can be formed using a sputtering process. The coating can partially block light and allow some light to enter the housing and the solar cells. Such a coating can partially cover the housing and solar cells to improve the visual appearance of eyewear without a pin hole. Moreover, with the omission of the pin hole, the solar cells can receive a uniform sheet of light without a light guide. As a result, the size and weight of the housing, as well as the overall size and weight of eyewear, can be reduced. Omission of a pinhole can also improve the flexibility of positioning of the housing.

In some embodiments, the solar cells can be in the form of one or more transparent solar membranes. For instance, one or more transparent solar membranes can be formed (e.g., by electroplating) on the edges (e.g., upper and lower edges, side edges, etc.) of lens assemblies (e.g., the lens stacks 104). The total surface area of one or more transparent solar membranes can also be configured based on the required range of voltages to be supplied by the driver circuit, which can in turn be based on the range of transmittance to be provided by the eyewear. Transparent solar membranes can take up less space compared to other solar cells, which enables the frame to be more compact and to have a lighter weight.

Figure 4:
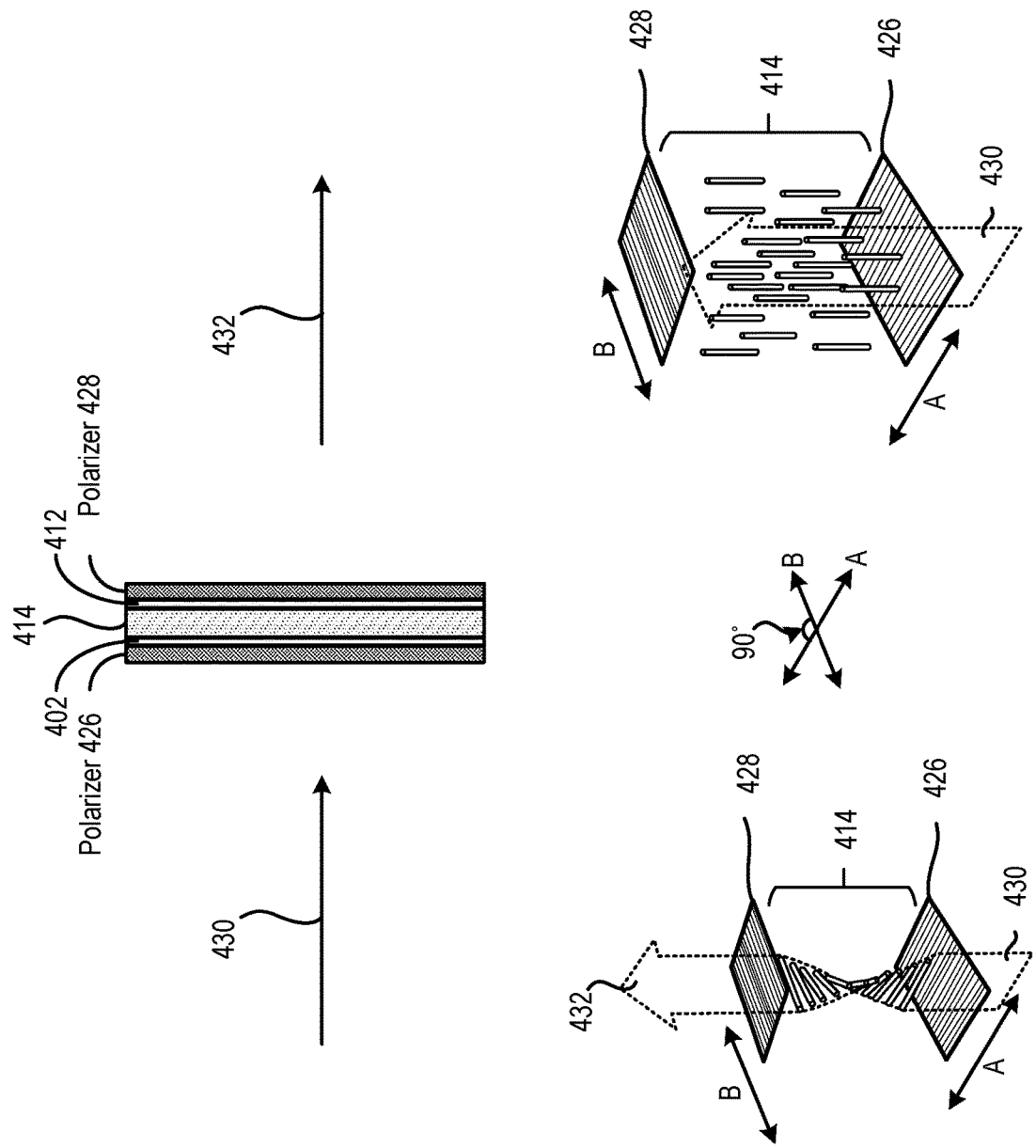
FIG. 4 shows an example of a twisted-nematic liquid crystal usable for implementing one or more embodiments.

FIG. 4 illustrates one example configuration of a liquid crystal 414 to provide adjustable light transmittance in accordance with some embodiments. As shown in FIG. 4, liquid crystal 414 can be configured as a twisted nematic (TN) liquid crystal. The liquid crystal particles can be aligned using rubbing patterns to form a twisted, helical structure in the absence of an applied electric field. The helical structure can rotate the polarization axis of polarized light as the polarized light traverses the liquid crystal layer, with the angle of rotation adjustable by an electric field applied across the liquid crystal layer, e.g., an electrical field formed using control signals produced by a control unit/module. As the polarized light traverses through the liquid crystal layer, the helical structure causes the polarization axis of the polarized light to rotate by a certain angle (e.g., a 90 degree angle) determined by the rubbing patterns. If an electric field is applied, the liquid crystal particles can align in parallel with the electric field. The polarization axis of the polarized light can be maintained and not rotated as the light traverses the aligned liquid crystal particles. Embodiments featuring TN liquid crystal are not limited to configurations that rotate the helical structure by a 90° twist angle. For example, in some implementations, an LC assembly (e.g., a lens stack 104 in FIG. 1A) may be configured to rotate the helical structure anywhere from 180° to 270° (a feature of super-twisted nematic (STN) displays). In some implementations, the rotation may be less than 90° (sometimes used to form mixed-mode TN (MTN) displays). Further, TN liquid crystal can include nematic liquid crystal with a chiral dopant that imparts chirality to the nematic liquid crystal. Accordingly, TN liquid crystal can be any liquid crystal that has a twisted structure in a default or voltage-off state, i.e., prior to applying an electric field to "untwist" the liquid crystal particles. Additionally, although FIG. 4 depicts a single rotational direction, in some implementations an LC assembly can have liquid crystal with two or more rotational directions to, for example, permit a different alignment of liquid crystal particles in a first segment than liquid crystal particles in a second segment.

In certain embodiments, a conductive layer corresponding to an electrode may be divided into different regions. For example, the conductive layer 332 and/or the conductive layer 342 in FIG. 3 can each be divided into different regions that correspond to segments, which can differ in shape and/or size. The different regions can be formed by chemically or mechanically etching the conductive layer to form etched patterns. The etched patterns are distinct from the above-described rubbing patterns and can be used to form discrete segments or, in the case of a liquid crystal display, discrete pixels (e.g., red, green, or blue sub-pixels). Such segments can be individually dimmable by controlling the liquid crystal alignment in the segments to display stripes, logos, text, or other graphics, with or without the aid of an electrically controllable illumination source such as a backlight. For example, an LC assembly can be configured as a seven-segment display, where dimming different combinations of the seven segments results in display of different numerals. Accordingly, a conductive layer can include multiple pairs of electrodes, where each pair of electrodes corresponds to a different region that is individually controllable through application of a corresponding electrical signal to establish a voltage across the pair of electrodes.

In the example of FIG. 4, the liquid crystal 414 is located between a first substrate 402 and a second substrate 412. Liquid crystal 414, as well as first substrate 402 and second substrate 412, can be sandwiched between a first polarizer layer 426 and a second polarizer layer 428. Alternatively, the polarizer layers 426, 428 can be intervening layers between the substrates 402, 412 and the liquid crystal 414. In a normally-white configuration, first polarizer layer 426 can have a polarization axis A, whereas second polarizer layer 428 can have a polarization axis B. The two polarization axes can form a 90-degree angle with respect to each other. Incoming light 430 can become linearly polarized by first polarizer layer 426. The linearly polarized light can be rotated by liquid crystal 414 by an angle configured by the TN structure as described above. Maximum light transmittance can be achieved in a case where no electric field is applied. When no electric field is applied, the liquid crystal 414 rotates the polarization axis of the polarized light to align with the polarization axis B of second polarizer layer 428. Minimum light transmittance can be achieved when the polarization axis of the polarized right is not rotated, due to application of an electric field, such that the polarization axis of the polarized light becomes perpendicular to the polarization axis B of second polarizer layer 428. In such a case, the polarized light aligns with the absorption axis of second polarizer layer 428 and can be absorbed by second polarizer layer 428 at a maximum absorption rate. The magnitude of the electric field determines the angle of rotation of the polarized light, which can vary the portion of incoming light 430 that passes through the liquid crystal 414 as outgoing light 432. A typical range of light transmittance achievable by a TN liquid crystal can be between 0.5% to 36%.

TN liquid crystal can provide various advantages compared to other liquid crystal technologies. For example, TN liquid crystal typically has extremely fast response characteristics and can adjust the light transmittance within a very short period of time (e.g., 100 milliseconds or less). TN liquid crystal can also provide good light blocking. For example, the minimum light transmittance of TN liquid crystal can reach as low as 0.1%. Additionally, as a TN liquid crystal does not have suspended particles or a polymer to scatter light, a TN liquid crystal cell may introduce less haze and may improve visibility across a range of light transmittance levels.

Additionally, as discussed above in connection with FIG. 3, it can be advantageous to include a flexible substrate in an LC assembly. For example, the substrate 402 and/or the substrate 412 may comprise a transparent flexible material such as polyethylene terephthalate (PET) or polyvinyl butyral (PVB). Accordingly, in some embodiments, a dimmable LC assembly includes: a flexible substrate, a liquid crystal layer including TN liquid crystal, and polarizer layers. Additionally, such an LC assembly can include a rigid transparent layer (e.g., glass, acrylic, or polycarbonate (PC)) configured to serve as a structural support for the LC assembly and to operate as a viewing window. This rigid transparent layer can be an additional layer laminated together with a substrate (e.g., substrate 402 or substrate 412), possibly with one or more intervening layers between the rigid transparent layer and the substrate (e.g., a connecting layer that holds the rigid transparent layer and the substrate together). In the case of eyewear, the rigid transparent layer may correspond to a lens that has been suitably shaped to provide vision correction to a user.

FIG. 5 illustrates another example configuration of a liquid crystal 514 to provide adjustable light transmittance in accordance with some embodiments. The example of FIG. 5 does not include polarizer layers. The use of polarizers is unnecessary in the example of FIG. 5 because liquid crystal 514 can be configured as a Guest-Host (GH) liquid crystal including liquid crystal particles 540, which act as a host, and dye particles 550, which act as a guest. Liquid crystal particles 540 and dye particles 550 can modulate the light transmittance based on the Guest-Host effect. Specifically, the dye particles 550 can be configured to absorb light having an electric field that is perpendicular to the long axis of the dye particles.

In FIG. 5, the rubbing patterns described above in reference to FIGS. 3 and 4 can have anti-parallel rubbing directions to set the initial orientation of the liquid crystal particles and dye particles based on operation mode. In a normally-white mode where a liquid crystal layer is in a transparent (maximally transmissive) state when no electric field is applied, the rubbing directions can be configured such that the long axis of the dye particles is parallel with the electric field of incoming light 530, and the absorption of light by the dye particles can be set at the minimum. When an electric field is applied across liquid crystal particles 540, the orientation of liquid crystal particles 540, as well as dye particles 550, can change accordingly. As a result, the portion of incident light 530 absorbed by dye particles 550, and thus the light transmittance of the liquid crystal layer, can be adjusted by the electric field applied across the liquid crystal layer. On the other hand, in a "normally-dark" mode, the rubbing directions can be configured such that the long axis of the dye particles is perpendicular to the electric field of incoming light 530, which leads to maximum absorption of light 530 by the dye particles. The absorption can be reduced by changing the orientation of the dye particles when an electric field is applied across the liquid crystal.

The example configurations shown in FIGS. 4 and 5 are not mutually exclusive. For example, in some implementations, a liquid crystal can be both a TN liquid crystal (having a twisted structure) and a GH liquid crystal (having dye particles).

By omitting polarizers, a GH-based LC assembly can increase the overall achievable light transmittance while providing reasonable light blocking properties. For example, using the Guest-Host effect, the light transmittance range can be between 10% to 80%. Moreover, a GH liquid crystal can also have fast response characteristics and can adjust the light transmittance within a very short period of time. Further, like TN liquid crystal, a GH liquid crystal does not have suspended particles or a polymer medium to scatter the light. Additionally, the color of the dye particles of a GH liquid crystal can be chosen to selectively transmit light of a particular color while blocking other colors.

In some embodiments, an LC assembly can include vertical alignment (VA) liquid crystals. In VA liquid crystals, the liquid crystal particles are homeotropic, meaning they are aligned perpendicular to the substrate surface in the absence of an applied electrical field. The homeotropic liquid crystal particles can be realigned to be parallel to the substrate surface by applying an electrical field. A VA liquid crystal generally has negative dielectric anisotropy. In some embodiments, the VA liquid crystal is a dual frequency liquid crystal (DFLC) that has positive dielectric anisotropy at low frequencies and negative dielectric anisotropy at high frequencies and is thus referred to as dual VA. VA liquid crystals can also be GH liquid crystals in which dye particles have been introduced.

In summary, in the dimmable vision correcting eyewear provided by the above-described embodiments, a first lens and a second lens can be combined to form a prescription lens assembly that also includes a dimmable liquid crystal layer (e.g., a liquid crystal layer stack as discussed above in reference to FIGS. 2A-2D). The dimmable liquid crystal layer can be hidden between the first lens and the second lens, thereby enabling the first lens and the second lens to protect the dimmable liquid crystal layer, e.g., against scratching or contamination. Such protection is beneficial to prolonging the service life of the dimmable eyewear. Especially for prescription patients, an excellent user experience can be obtained when using the dimmable eyewear. The dimmable eyewear can use manual control to control the light transmittance of the liquid crystal layer and can, in some embodiments, also use automatic control to control the light transmittance to provide the user with flexible control and convenience.

The above-mentioned embodiments are only used to illustrate specific implementations of the present invention. It should be pointed out that for those of ordinary skill in the art, without departing from the concept of the present invention, several modifications and changes can be made, and these modifications and changes should fall within the protection scope of the present invention.

What is claimed is:

1. A prescription dimming glasses comprising:
   an eyeglass frame;
   at least one lens stack mounted on the eyeglass frame; and
   a control module, wherein:
      each lens stack of the at least one lens stack comprises a first lens, a dimmable liquid crystal layer, and a second lens, the dimmable liquid crystal layer being positioned between the first lens and the second lens;
      the first lens and the second lens of each lens stack form an optical system configured to correct a vision of a user wearing the prescription dimming glasses; and
      the control module is configured to output one or more signals controlling a light transmittance of the dimmable liquid crystal layer in each lens stack.

2. The prescription dimming glasses of claim 1, wherein:
   a first surface of the first lens is a concave surface,
   a second surface of the first lens is a flat surface and is connected to a first surface of the dimmable liquid crystal layer, and
   a first surface of the second lens is a flat surface and is connected to a second surface of the dimmable liquid crystal layer.

3. The prescription dimming glasses of claim 2, wherein a second surface of the second lens is a convex surface.

4. The prescription dimming glasses of claim 2, wherein a second surface of the second lens is a concave surface.

5. The prescription dimming glasses of claim 1, wherein:
   a first surface of the first lens is a convex surface,
   a second surface of the first lens is a flat surface and is connected to a first surface of the dimmable liquid crystal layer, and
   a first surface of the second lens is a flat surface and is connected to a second surface of the dimmable liquid crystal layer.

6. The prescription dimming glasses of claim 5, wherein a second surface of the second lens is a convex surface.

7. The prescription dimming glasses of claim 1, wherein the first lens and the second lens comprise glass.

8. The prescription dimming glasses of claim 1, wherein the first lens and the second lens comprise resin.

9. The prescription dimming glasses of claim 1, wherein a refractive index of the first lens is the same as a refractive index of the second lens.

10. The prescription dimming glasses of claim 1, wherein the dimmable liquid crystal layer comprises a first substrate, a second substrate, and a first liquid crystal layer, the first liquid crystal layer being located between the first substrate and the second substrate.

11. The prescription dimming glasses of claim 10, wherein the first liquid crystal layer comprises guest host liquid crystal.

12. The prescription dimming glasses of claim 10, wherein the first liquid crystal layer comprises twisted nematic liquid crystal.

13. The prescription dimming glasses of claim 10, wherein the dimmable liquid crystal layer further comprises a second liquid crystal layer.

14. The prescription dimming glasses of claim 1, wherein:
the control module comprises a control board, a power supply, and a light sensor; and
the control board is electrically connected to the power supply, the light sensor, and the dimmable liquid crystal layer.

15. The prescription dimming glasses of claim 1, wherein:
the control module comprises a control board, a power supply, and a user input device;
the control board is electrically connected to the user input device, the dimmable liquid crystal layer, and the power supply.

16. The prescription dimming glasses of claim 15, wherein the user input device is a control key.

17. A lens assembly comprising:
a first lens;
a second lens; and
a liquid crystal stack comprising:
a first substrate,
a second substrate, and
a liquid crystal layer between the first substrate and the second substrate;
wherein:
the first lens comprises a first surface connected to the first substrate and a second surface opposite the first surface;
the second lens comprises a third surface connected to the second substrate and a fourth surface opposite the third surface;
the second surface and the fourth surface are curved such that the first lens and the second lens together form an optical system configured to correct vision; and
the liquid crystal stack is configured to vary a light transmittance of the liquid crystal layer based on a voltage applied across the liquid crystal layer.

18. The lens assembly of claim 17, wherein the first lens and the second lens are configured to provide an optical power suitable for correcting myopia.

19. The lens assembly of claim 17, wherein the liquid crystal stack further comprises:
a first conductive layer facing a first side of the liquid crystal layer; and
a second conductive layer facing a second side of the liquid crystal layer, wherein the first conductive layer and the second conductive layer operate as electrodes for receiving the voltage applied across the liquid crystal layer.

20. The lens assembly of claim 17, wherein:
the first surface and the third surface are both flat; and
the second surface and the fourth surface are both concave, both convex, or one concave and the other convex.

* * * * *